(12) United States Patent
Ohkubo

(10) Patent No.: US 7,159,484 B2
(45) Date of Patent: Jan. 9, 2007

(54) LINEAR MOTION DEVICE

(75) Inventor: Tsutomu Ohkubo, Gunma (JP)

(73) Assignee: NSK Ltd., Tokyo (JP)

( * ) Notice: Subject to any disclaimer, the term of this patent is extended or adjusted under 35 U.S.C. 154(b) by 162 days.

(21) Appl. No.: 10/388,482

(22) Filed: Mar. 17, 2003

(65) Prior Publication Data
US 2003/0172760 A1 Sep. 18, 2003

(30) Foreign Application Priority Data
Mar. 18, 2002 (JP) ............ P.2002-075059

(51) Int. Cl.
*F16H 25/24* (2006.01)
(52) U.S. Cl. ............ 74/424.88; 74/424.82; 384/520
(58) Field of Classification Search ........... 74/424.82, 74/424.88; 384/43, 45, 520
See application file for complete search history.

(56) References Cited

U.S. PATENT DOCUMENTS

| 3,208,806 A | 9/1965 | Grolmann et al. | |
|---|---|---|---|
| 6,347,558 B1 * | 2/2002 | Miyaguchi et al. | 74/424.71 |
| 6,513,978 B1 * | 2/2003 | Shirai et al. | 384/45 |
| 6,655,839 B1 * | 12/2003 | Yamaguchi et al. | 384/45 |
| 2001/0007685 A1 | 7/2001 | Kasuga et al. | |
| 2002/0139209 A1 * | 10/2002 | Takagi et al. | 74/424.82 |

FOREIGN PATENT DOCUMENTS

| DE | 101 08 642 A | 9/2001 |
|---|---|---|
| EP | 1 186 790 A1 | 3/2002 |
| GB | 845 833 A | 8/1960 |

* cited by examiner

*Primary Examiner*—William C Joyce
(74) *Attorney, Agent, or Firm*—Sughrue Mion, PLLC

(57) ABSTRACT

A linear motion device includes an inner member and an outer member cooperatively forming a ball circulating path therebetween, a plurality of balls rollably disposed in the ball circulating path, and a plurality of retaining pieces interposed between the balls, wherein the ratio of a ball-to-ball direction force applied to the retaining piece by the balls disposed at the both sides thereof to the elastic displacement of the retaining piece by the force is adjusted to a range of from 0.1 to 10 [N/μm] from 0.1 to 10 [N/μm] by predetermining a bore diameter of a through-hole formed at the central portion of the retaining piece to a range of from 35% to 65% of a diameter of the ball.

4 Claims, 4 Drawing Sheets

LINEAR MOTION DEVICE

BACKGROUND OF THE INVENTION

1. Field of the Invention

The present invention relates to a linear motion device such as ball screw and linear guide for use in the feed mechanism for various apparatus and more particularly to a linear motion device which is used at a low preload in environments requiring high operating characteristics and durability.

2. Description of the Related Art

This type of a linear motion device includes an inner member, an outer member, and a plurality of balls which are interposed therebetween as rolling elements in such a manner that they can be endlessly circulated.

In a ball screw for example, a nut which is an outer member is fitted on the outer periphery of a screw shaft which is an inner member. The outer periphery of the screw shaft and the inner periphery of the nut each have a helical ball rolling groove formed thereon. These ball rolling grooves are formed opposed to each other to form a ball rolling path.

The nut includes a return path formed therein extending from one end of the ball rolling path to the other. The ball rolling path and the return path form a current of endless circulating path in which a plurality of balls are disposed adjacent to each other.

In such a ball screw which is a linear motion device, the rotation of the screw shaft and the nut relative to each other causes the balls to be endlessly circulated in the endless circulating path while rolling therein, allowing the nut to make linear movement relative to the screw shaft.

In a linear guide, a slider which is an outer member is fitted on the exterior of a guide rail which is an inner member. A ball rolling groove is formed along the longitudinal direction of the guide rail on the opposing side of the guide rail and the slider. These ball rolling grooves are opposed to each other to form a ball rolling path.

The slider includes a return path formed therein extending from one end of the ball rolling path to the other. The ball rolling path and the return path form a current of endless circulating path in which a plurality of balls are disposed adjacent to each other. The linear movement of the guide rail and the slider relative to each other causes the balls to be endlessly circulated in the endless circulating path while rolling therein.

During the operation of such a linear motion device, load is applied to the balls when they are rolling over the part of the ball rolling path formed by the ball rolling grooves.

Unlike ball bearings, linear motion devices such as ball screw and linear guide have no retainers for retaining the balls. In the linear motion devices, therefore, the balls undergo competition (pushing) with each other in a loaded range when they are rolling, making it likely that the operating characteristics thereof or the life of the balls and the rolling grooves can be deteriorated.

Such a linear motion device has balls incorporated as rolling elements in the endless circulating path with some clearance therebetween. Accordingly, the balls cannot come in contact with each other so far as all the balls make an ideal rolling movement. However, competition of the balls by collision is inevitable depending on the precision of the rolling grooves, the state of contact of the balls with the rolling grooves, the working conditions, etc.

When competition of the balls occurs, the balls roll with difficulty and thus undergo slippage with the rolling grooves, resulting in the deterioration of the operating characteristics of the linear motion device and the life of the balls and the rolling grooves.

In recent years, for the purpose of preventing the competition of balls with each other, it has been often practiced to provide a retaining piece interposed between the balls.

As shown in FIG. 5, a retaining piece 1 is disposed interposed between juxtaposed balls 2 to prevent the contact of the balls 2 with each other. The retaining piece 1 is received in the endless circulating path 3 of a ball screw as shown in FIG. 6 while being carried by the ball 2 at both sides thereof in such an arrangement that it can flexibly follow the angular change of the circulating path 3.

In FIG. 6, the reference numeral 4 indicates the screw shaft of a ball screw on the periphery of which a nut 5 is fitted. The outer periphery of the screw shaft 4 and the inner periphery of the nut 5 have helical ball rolling paths 7, 8 formed opposed to each other, respectively. The ball rolling groove 8 on the nut 5 and the ball rolling groove 7 on the screw shaft 4 form a ball rolling path 9.

The nut 5 includes a tube 10 provided therein to form a return path connecting one end of the ball rolling path 9 to the other. The tube 10 and the ball rolling path 9 form an endless circulating path 3 in which a number of balls 3 and retaining pieces 1 each interposed therebetween are received. In this arrangement, when the nut 5 rotates helically relative to the screw shaft 4, the balls 2 are endlessly circulated in the endless circulating path 3.

During this procedure, the retaining piece 1 makes sliding movement with the balls 2. In the case where the frictional force developed by this sliding movement doesn't prevent the rolling movement of the balls 2 on the rolling grooves 7, 8, it results in no deterioration of the operating characteristics or the life of the balls 2 and the rolling grooves 7, 8.

However, as the force applied to the retaining piece 1 by the balls 2 increases to raise the frictional force between the balls 2 and the retaining piece 1, the rolling movement of the balls 2 is adversely affected, causing sliding movement of the balls 2 with the rolling grooves 7, 8. As a result, the operating characteristics of the linear motion device or the life of the balls 2 and the rolling grooves 7, 8 is deteriorated. This phenomenon can easily occur with low preload linear motion devices showing a low surface pressure on the rolling portion or linear motion devices having a large number of balls in the circulating path 3.

Further, when the precision of the rolling grooves 7, 8 is poor or the linear motion device is under offset load due to swinging operation or the like, the force developed between the balls increases, resulting in the deterioration of the operating characteristics of the linear motion device or the life of the balls 2 and the rolling grooves 7, 8 for the same reason as mentioned above.

In order to relax these problems or attain the reduction of noise, an elastomer having elastic property may be used. However, a material having elasticity essentially has swell characteristics and thus tends to absorb an oil or water to swell.

When the retaining piece 1 swells, the clearance of the balls 2 and the retaining pieces 1 within the circulating path 3 is reduced, jamming the circulating path 3 with the balls 2 and the retaining pieces 1. Thus, a great force is developed across the balls 2 and the retaining pieces 1, adding to the frictional force therebetween. As a result, it is likely that adverse effects can be exerted on the operating characteristics and durability of the linear motion device.

It has been proposed that the retaining piece 1 has a groove-like notch 11 formed on the periphery thereof to become an elastic structure itself as shown in FIG. 7. In this case, however, the mold die for forming the retaining piece 1 is complicated or the retaining piece 1 has a complicated configuration in the outer periphery thereof, making it more likely that the retaining piece 1 can be caught by the inner wall of the circulating path 3.

In general, the retaining piece 1 is adjusted to have a slight clearance from the inner wall of the circulating path 3 and is incorporated in the circulating path 3. When the filling clearance of the retaining piece 1 is too small or the retaining pieces 1 are filled in the circulating path 3 too much, the rolling movement of the balls 2 is prevented, adversely affecting the operating characteristics or the life of the linear motion device. On the contrary, when the filling clearance of the retaining piece 1 is too great, it causes the retaining piece 1 to fall down or be caught by the inner wall of the circulating path 3. Thus, the filling clearance of the retaining piece 1 must be severely controlled. Accordingly, it takes much time and labor to adjust the filling clearance of the retaining piece

SUMMARY OF THE INVENTION

The invention has been worked out in this respect. An aim of the invention is to provide a linear motion device which includes a retaining piece having a rigidity reduced by a simple means to exhibit good operating characteristics and durability even when it is particularly under a low preload load.

In order to accomplish the aforementioned aim, there is provided a linear motion device including an inner member and an outer member, cooperatively forming a ball circulating path therebetween;

a number of balls rollably disposed in the ball circulating path; and a retaining piece interposed between the balls, wherein the ratio of a ball-to-ball direction force applied to the retaining piece by the balls disposed at the both sides thereof to the elastic displacement of the retaining piece by the force is from 0.1 to 10 [N/μm].

The adjustment of the rigidity of the retaining piece is accomplished by predetermining the bore diameter of a through-hole formed at the central portion to a range of from 35% to 65% of the ball.

DETAILED DESCRIPTION OF THE PREFERRED EMBODIMENTS

Figure 1A:
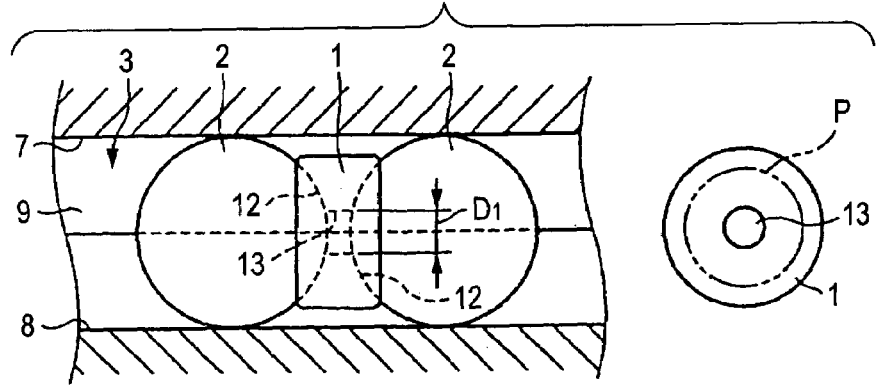
FIGS. 1A and 1B are diagrams illustrating how a retaining piece according to the first embodiment of the invention is used as compared with the related art retaining piece.
Figure 1B:
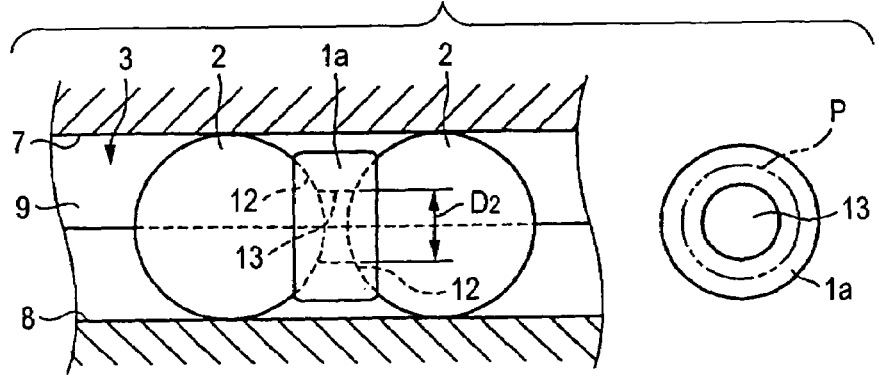

Embodiments of the invention will be described hereinafter in connection with FIGS. 1A to 4. FIGS. 1A and 1B illustrate a related art retaining piece 1 for comparison and a retaining piece 1a according to the invention, respectively.

Each of these retaining pieces 1, 1a is in the form of disc having a smaller outer diameter than the diameter of a ball 2 and has a circular concave portion 12 at the both axial ends thereof in which the ball 2 is slidably fitted. Each of the retaining pieces 1, 1a also has a circular through-hole 13 formed at the central portion of the concave portion 12 extending from one of the concave portions 12 to the other.

The concave portion 12 has a gothic or conical section in which a part of the surface of the ball 12 is fitted. The chain line P shown in FIGS. 1A and 1B indicates the position at which the ball 12 comes in contact with the concave portion 12. The related art retaining piece 1 and the retaining piece 1a of the invention are made of the same synthetic resin, e.g., nylon.

In the related art retaining piece 1, the bore diameter $D_1$ of the through-hole 13 is about 30% of the diameter of the ball 2. This size causes no problems in ordinary use. However, as previously mentioned, this retaining piece 1 cannot exhibit predetermined operating characteristics in a ball screw which operates under a low preload load and thus is subject to slippage of ball 2 on the rolling grooves 7, 8 with ease.

In the retaining piece 1a according to the invention, the bore diameter $D_2$ of the through-hole 13 is greater than that of the related art retaining piece and from about 35% to 65% of the diameter of the ball 2.

The retaining piece 1a provided with a through-hole 13 having an increased bore diameter exhibits a reduced rigidity and thus undergoes flexible deformation by a force in an axial direction, that is, a force in a direction connecting between the centers of balls (a ball-to-ball direction force) applied to the retaining piece by the balls 2 disposed at both sides thereof.

Figure 2:
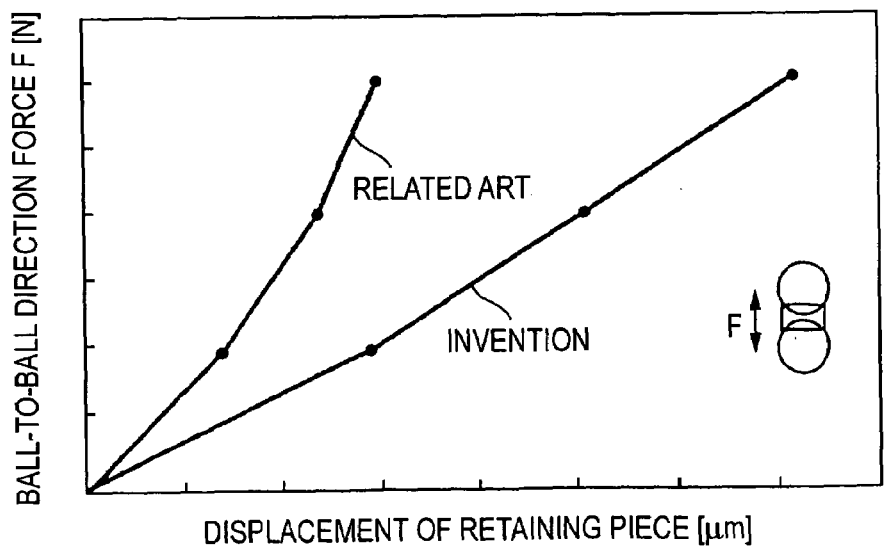
FIG. 2 is a graph illustrating the difference in rigidity between the retaining piece according to the first embodiment of the invention and the related art retaining piece for comparison.

FIG. 2 illustrates the comparison in rigidity of the retaining piece 1a of the invention with the related art retaining piece 1, i.e., a relationship of the ball-to-ball direction force and the displacement of the retaining pieces 1, 1a by elastic deformation.

As can be seen in FIG. 2, the retaining piece 1a of the invention exhibits a greater displacement by elastic deformation (compression) with respect to the ball-to-ball direction force and a smaller rigidity than the related art retaining piece 1.

The rigidity of the retaining piece 1a can be arbitrarily adjusted by changing the bore diameter of the through-hole 13. In the invention, the bore diameter of the through-hole 13 is predetermined to a range of from about 35% to 65% of the diameter of the ball 2 so that the ratio of the ball-to-ball direction force applied to the retaining piece 1a by the balls disposed at the both sides thereof to the elastic displacement of the retaining piece by this force is from 0.1 to 10 [N/μm]. By way of example, the bore diameter of the through-hole 13 is predetermined to 50% of the diameter of the ball 2 so that the ratio of the ball-to-ball direction force applied to the retaining piece 1a by the balls disposed at the both sides thereof to the elastic displacement of the retaining piece by this force is set to be 2 [N/μm]. This is the case of a ball screw including a steel ball having a diameter of 3.175 mm as a ball and a shaft having a diameter of 32 mm which operates at a lead of 5 mm and a preload of 1,200 N.

Figure 3A:
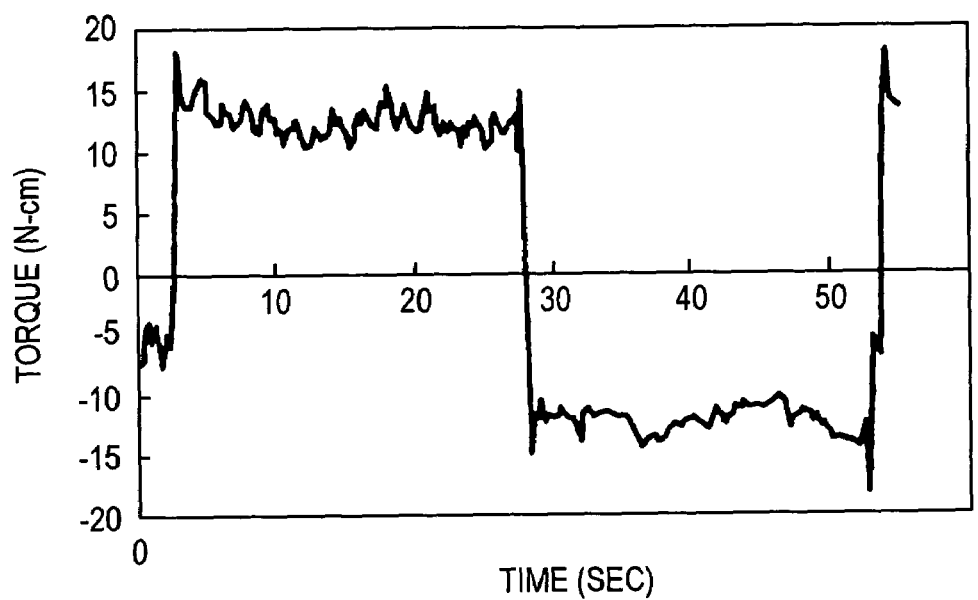
FIGS. 3A and 3B are graphs illustrating the dynamic torque characteristics of a ball screw comprising a retaining piece according to the first embodiment of the invention and a ball screw comprising a related art retaining piece for comparison.
Figure 3B:
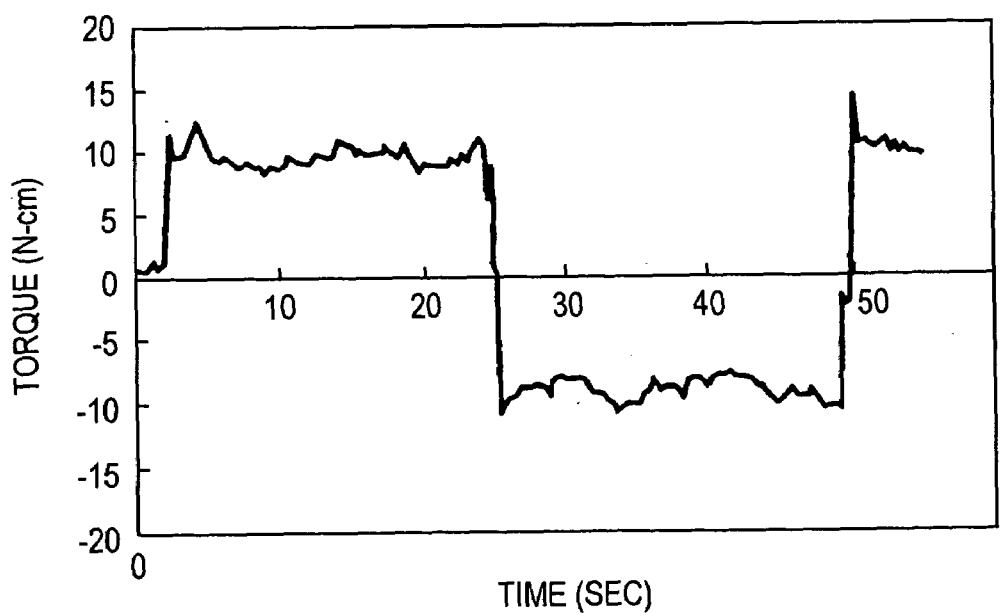

FIG. 3A illustrates the dynamic torque characteristics of a ball screw having the related art retaining piece 1 incorporated in the circulating path 3. FIG. 3B illustrates the dynamic torque characteristics of a ball screw having the retaining piece 1a of the invention incorporated in the circulating path 3.

As shown in FIG. 3A, when the related art retaining piece 1 is used, a great torque change occurs to cause jamming with the balls 2. On the contrary, when the retaining piece 1a of the invention is used, the torque change is reduced to eliminate jamming with the balls 2.

In some detail, the operating characteristics of ball screws which are subject to slippage of balls 2 with the rolling grooves 7, 8, particularly, under low preload can be improved by adjusting the rigidity of the retaining piece 1a such that the ratio of the ball-to-ball direction force applied to the retaining piece 1a by the ball disposed at the both sides thereof to the elastic displacement of the retaining piece by this force is from 0.1 to 10 [N/μm].

Further, in the invention, since the retaining piece 1a has a proper elasticity, excessive force cannot be applied to the surface of the concave portion 12 in which the ball 2 fits, making it possible to inhibit the abrasion on the surface of the concave portion 12 and hence obtain a good stability over an extended period of time.

Figure 7:
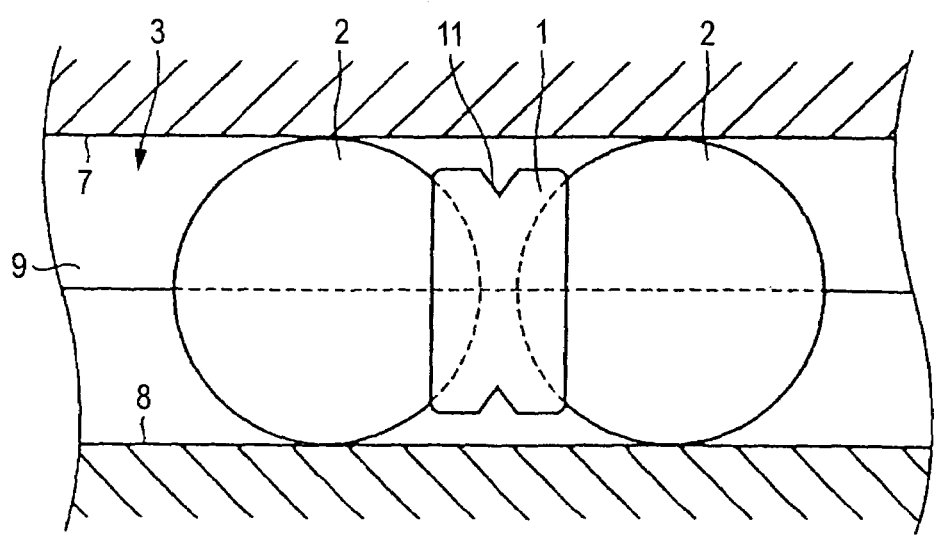
FIG. 7 is a diagram illustrating how a related art retaining piece having another structure is used.

In the invention, the rigidity of the retaining piece 1a is adjusted by changing the size of the through-hole 13 of the retaining piece 1a. In this arrangement, unlike the case where the retaining piece 1 is provided with a notch 11 on the periphery thereof to adjust the rigidity thereof as shown in FIG. 7, the periphery of the retaining piece 1a can be kept smooth, making it possible to prevent catching in the circulating path 3. Further, since nothing is required than mere change of the bore diameter of the through-hole 13, the mold for forming the retaining piece 1a doesn't need to be complicated, making it possible to prepare the retaining piece easily at a reduced cost.

In this connection, in the case where the contact of balls is not tolerated as in ball screws for use under ultrahigh load, a retaining piece having a rigidity as high as greater than the range of from 0.1 to 10 N/μm as calculated in terms of ratio of the ball-to-ball direction force to displacement is used.

Figure 4:
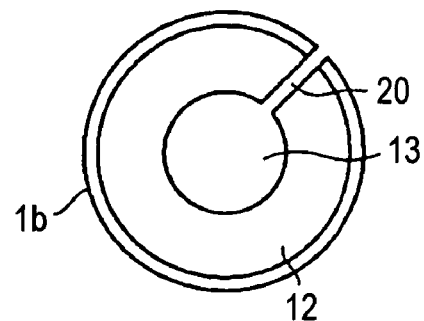
FIG. 4 is a front view illustrating a retaining piece according to the second embodiment of the invention.
Figure 5:
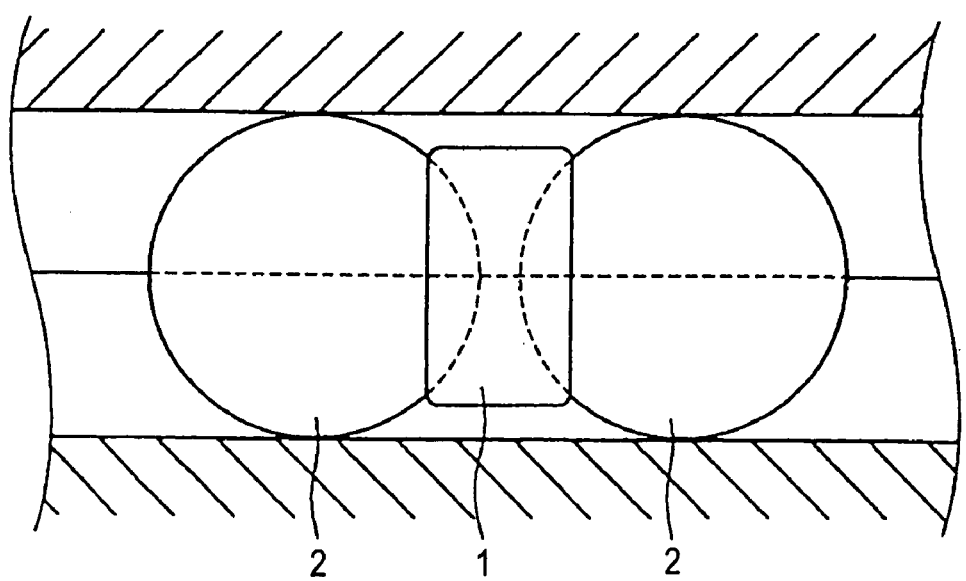
FIG. 5 is a diagram illustrating how a related art retaining piece is used.
Figure 6:
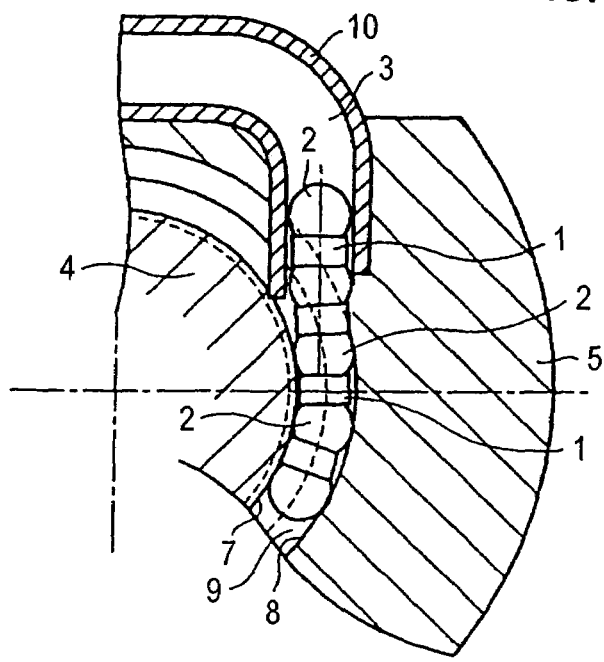
FIG. 6 is a sectional view illustrating the structure of a part of a related art ball screw.

FIG. 4 illustrates a retaining piece 1b according to a second embodiment of the invention. The retaining piece 1b has a slit 20 formed to extend from the outer periphery thereof to the peripheral edge of the through-hole 13. With the slit 20, the retaining piece 1b is in the form of substantially "C" as viewed in the axial direction. By providing such a slit 20 in combination with the change of the bore diameter of the through-hole 13, the rigidity of the retaining piece 1b can be adjusted to a predetermined value, making it possible to improve the operating characteristics of the ball screw.

Further, the invention can be combined with a material having an elastic force such as elastomeric material.

While the various embodiments have been described with reference to retaining piece to be incorporated in ball screw, the invention may be similarly applied to retaining piece to be incorporated in the linear guide.

As mentioned above, in accordance with the invention, the bore diameter of the through-hole of the retaining piece is adjusted to reduce the rigidity of the retaining piece and hence the frictional force of the balls with the retaining piece, making it possible to inhibit slippage of the balls with the ball rolling groove. In this arrangement, even a linear motion device which operates under a preload load can be provided with enhanced operating characteristics and durability.

While only certain embodiments of the invention have been specifically described herein, it will be apparent that numerous modification may be made thereto without departing from the spirit and scope of the invention.

What is claimed is:

1. A linear motion device, comprising:
   an inner member and an outer member, cooperatively forming a ball circulating path therebetween;
   a number of balls rollably disposed in the ball circulating path; and
   a retaining piece interposed between the balls,
   wherein the ratio of a ball-to-ball direction force applied to the retaining piece by the balls disposed at the both sides thereof to the elastic displacement of the retaining piece by the force is from 0.1 to 10 (N/μm), and
   wherein the retaining piece has a through-hole formed at the central portion thereof, a bore diameter of which is from 35% to 65% of a diameter of the ball, to thereby obtain the ratio.

2. The linear motion device as described in claim 1, wherein a surface of the retaining piece that receives the ball is a concave surface.

3. The linear motion device as described in claim 1, wherein the retaining piece has a slit formed so as to extend from an outer periphery of the retainer to a peripheral edge of the through hole.

4. A linear motion device, comprising:
   an inner member and an outer member, cooperatively forming a ball circulating path therebetween;
   a number of balls rollably disposed in the ball circulating path; and
   a retaining piece interposed between the balls, said retaining piece comprising a through-hole formed at the central portion thereof,
   wherein the ratio of a ball-to-ball direction force applied to the retaining piece by the balls disposed at the both sides thereof to the elastic displacement of the retaining piece by the force is from 0.1 to 10 (N/μm), and
   wherein the retaining piece has a slit formed so as to extend from an outer periphery of the retaining piece to a peripheral edge of the through hole.

* * * * *